United States Patent
Yamashita et al.

(10) Patent No.: US 11,110,923 B2
(45) Date of Patent: Sep. 7, 2021

(54) ADAPTIVE CRUISE CONTROL DEVICE

(71) Applicant: HONDA MOTOR CO., LTD., Tokyo (JP)

(72) Inventors: Akifumi Yamashita, Wako (JP); Masayuki Hashimoto, Wako (JP); Naotoshi Takemura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 260 days.

(21) Appl. No.: 16/425,472

(22) Filed: May 29, 2019

(65) Prior Publication Data
US 2019/0375406 A1    Dec. 12, 2019

(30) Foreign Application Priority Data

Jun. 7, 2018  (JP) .............................. JP2018-109387

(51) Int. Cl.
*B60W 30/165*    (2020.01)
*G06K 9/32*    (2006.01)

(52) U.S. Cl.
CPC ......... *B60W 30/165* (2013.01); *G06K 9/3258* (2013.01); *G06K 2209/15* (2013.01)

(58) Field of Classification Search
CPC ............ B60W 30/165; G06K 2209/15; G06K 9/00791; G06K 9/325; G06K 9/3258
See application file for complete search history.

(56) References Cited

U.S. PATENT DOCUMENTS

| | | | |
|---|---|---|---|
| 6,289,278 B1* | 9/2001 | Endo ..................... | G01C 21/367 701/431 |
| 10,293,826 B2* | 5/2019 | Clarke .............. | B60W 30/0953 |
| 10,556,588 B2* | 2/2020 | Tamura ................ | B60W 10/18 |
| 2001/0014846 A1* | 8/2001 | Sawamoto ......... | B60K 31/0008 701/96 |
| 2002/0016663 A1* | 2/2002 | Nakamura ......... | B60K 31/0008 701/96 |
| 2013/0314503 A1* | 11/2013 | Nix .................... | G06K 9/00805 348/46 |
| 2017/0015327 A1* | 1/2017 | Henel .................... | B60T 7/122 |
| 2017/0313312 A1* | 11/2017 | Park .................... | B60W 30/165 |

(Continued)

FOREIGN PATENT DOCUMENTS

| | | |
|---|---|---|
| JP | H06180793 A | 6/1994 |
| JP | 2001034897 A | 2/2001 |

(Continued)

OTHER PUBLICATIONS

English translation of Notice of Reasons for Refusal for JP Application No. 2018-109387, dated Nov. 26, 2019, 8 pages.

*Primary Examiner* — Babar Sarwar
(74) *Attorney, Agent, or Firm* — Armstrong Teasdale LLP

(57) ABSTRACT

An adaptive cruise control device (10) follows a designated preceding vehicle according to information gained by an image capturing unit (11) and an object measurement unit (12), and further includes a license plate recognition unit (21, 22) which selects an image processing area (A3) from each object detected by the object measurement unit, and, if the detected object is a vehicle, recognizes a plate number from image processing area. If the plate number matches a stored plate number of the designated vehicle to be followed, the detected object is authenticated as the designated vehicle to be followed.

14 Claims, 12 Drawing Sheets

(56) References Cited

U.S. PATENT DOCUMENTS

| | | | | |
|---|---|---|---|---|
| 2017/0361841 A1* | 12/2017 | Kojo | ................. | B60W 30/0956 |
| 2018/0015922 A1* | 1/2018 | McNew | ................. | B60W 10/18 |
| 2018/0240258 A1* | 8/2018 | Kosaka | .................... | G06T 3/20 |
| 2019/0139231 A1* | 5/2019 | Aizawa | ................... | G06T 7/248 |
| 2019/0143971 A1* | 5/2019 | Makled | ............ | G08G 1/096725 |
| | | | | 701/96 |

FOREIGN PATENT DOCUMENTS

| | | |
|---|---|---|
| JP | 2003178291 A | 6/2003 |
| JP | 2006163879 A | 6/2006 |
| JP | 4760363 B2 | 8/2011 |
| JP | 2015087969 A | 5/2015 |
| JP | 2018039284 A | 3/2018 |

* cited by examiner

Fig.9
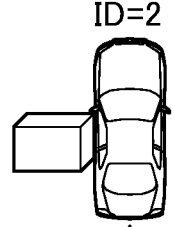
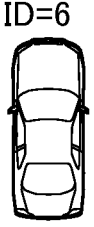
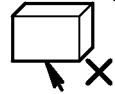
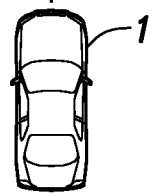
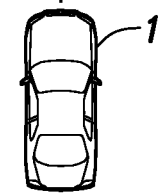
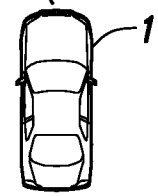
(A)   (B)   (C)

(A) (B) (C)

ADAPTIVE CRUISE CONTROL DEVICE

TECHNICAL FIELD

The present invention relates to an adaptive cruise control device for allowing an own vehicle to automatically follow a preceding vehicle.

BACKGROUND ART

In recent years, technologies known as ACC (Adaptive Cruise Control) and CACC (Cooperative Adaptive Cruise Control) have come to be installed in mass produced vehicles. An adaptive cruise control allows the own vehicle to automatically follow a preceding vehicle. As a further development of such technologies, there have been various proposals to use such technologies for forming a platoon of vehicles such as cars and trucks on highways. In a platoon of vehicles, the leading vehicle is either manually or autonomously operated, and the following vehicles line up behind the leading vehicle with each vehicle following the immediately preceding vehicle without at a prescribed gap by using an adaptive cruise control device. Oftentimes, each vehicle remotely acquires information on the dynamic state of the preceding vehicle so that the gap between the vehicles may be reduced without the risk of colliding with one another.

When a platoon is to be formed by a prescribed group of vehicles, it is necessary for each vehicle (excluding the leading vehicle) to correctly identify the preceding vehicle in order for the vehicles to form the intended platoon. To meet such a need, it has been proposed to form a platoon by using an authentication process and a distance measuring arrangement. See JP2015-087969 A, for instance. According to this prior proposal, the license plate (number plate) of a preceding vehicle is detected from a captured image so that the distance and the direction to the preceding vehicle can be determined according to the size and the direction of the detected plate number on the license plate, and the preceding vehicle is correctly identified by recognizing the plate number on the license plate. The own vehicle is thus enabled to follow the preceding vehicle by correctly identifying the preceding vehicle while determining the distance and the direction to the preceding vehicle.

However, according to this prior proposal, as the distance to the preceding vehicle increases, the resolution power of the image capturing device is required to be increased in order to accurate recognize the characters on the license plate, and this increases the computational load on the image recognition device employed for recognizing the plate number. As a result, the time required for the authentication process tends to be undesirably great, and/or the accuracy in determining the characters on the license plate of the preceding vehicle tends to be undesirably poor.

SUMMARY OF THE INVENTION

In view of such a problem of the prior art, a primary object of the present invention is to provide an adaptive cruise control device that can reduce the time required for the authentication process, and correctly authenticate the preceding vehicle.

The present invention accomplishes such an object by providing an adaptive cruise control device (10), comprising: an object measurement unit (12) configured to detect objects located ahead of an own vehicle, assign an ID to each detected object, and measure a direction and a distance to each detected object; a user interface (17) configured to accept an input to designate a preceding vehicle to be followed from the objects detected by the object measurement unit; an image capturing unit (11) configured to capture an image of each of at least some of the objects detected by the object measurement unit: a license plate recognition unit (21) configured to extract a license plate area from each of the images captured by the image capturing unit, and recognize alphanumeric characters from each license plate area by using an image recognition technique; a storage unit (18) configured to store information on the designated preceding vehicle, the information including the ID and alphanumeric characters of a license plate of the designated preceding vehicle; an alphanumeric character matching unit (22) configured to compare the alphanumeric characters recognized from at least one of the images of the license plate areas captured by the image capturing unit with the alphanumeric characters stored in the storage unit; a preceding vehicle determination unit (24) configured to determine the designated preceding vehicle from an output from the object measurement unit, and correct or authenticate the determined preceding vehicle according an output from the alphanumeric character matching unit; and a drive control unit (16) configured to control driving of the own vehicle so as to follow the determined preceding vehicle.

Since the license plate recognition unit is only required to process the image data acquired from the license plate area of each detected object, the computational load for the image recognition process is minimized so that the recognition of the alphanumeric characters on the detected license plate of the preceding vehicle can be performed both accurately and promptly.

Preferably, the user interface is configured to accept an input of the ID associated with the vehicle to be followed.

Thereby, the use can easily designate the vehicle to be followed.

According to an alternate embodiment, the user interface is configured to accept an input of alphanumeric characters on the license plate of the vehicle to be followed, and forward the accepted alphanumeric characters to the storage unit.

Thereby, the adaptive cruise control device can promptly and directly start authenticating the vehicle to be followed by using the alphanumeric character matching unit.

Preferably, the adaptive cruise control device further comprises an object estimation unit (23) configured to estimate a current position of each detected object from a previous position of the detected object as measured by the object measurement unit in a previous operation cycle, wherein upon failing to authenticate the determined preceding vehicle according to the output from the alphanumeric character matching unit, the preceding vehicle determination unit (24) is configured to identify an object which is closest to the estimated position of the determined preceding vehicle as the designated preceding vehicle.

Thereby, even when the alphanumeric character matching unit is temporarily unable to correctly identify the designated preceding vehicle, the estimation unit allows the own vehicle to follow the designated preceding vehicle according to the best estimate that is available.

According to a most simple arrangement, the estimated position is the previous position of the detected object. Alternatively, it may be arranged such that the estimated position is estimated from the previous position of the detected object by taking into account a previously detected speed of the detected object.

In either case, by using only the information gathered by the object measurement unit, the adaptive cruise control device is allowed to keep track of the vehicle to be followed to some extent without relying on the operation of the license plate recognition unit and the alphanumeric character matching unit which require a relatively heavy computational load.

Preferably, the object measurement unit covers a wider area than the image capturing unit.

By covering a relatively large area by the object measurement unit, the reliability in correctly determining the designated preceding vehicle can be enhanced. By limiting the area to be covered by the image capturing unit, the computational load can be reduced, and the extraction of the license plate area can be facilitated.

The object measurement unit typically comprises a LIDAR device. Thereby, the objects ahead of the own vehicle can be detected by using a relatively simple structure at high speed. The LIDAR may be a scanning LIDAR or a phase array LIDAR.

Preferably, the preceding vehicle determination unit is configured to compute a first evaluation value according to a difference between the alphanumeric characters on the license plate of the determined preceding vehicle and the alphanumeric characters as stored in the storage unit, the first evaluation value being taken into account when the determined preceding vehicle is corrected or authenticated by the preceding vehicle determination unit.

Thereby, the process of authenticating the determined preceding vehicle can be simplified.

Preferably, when the license plate recognition unit has failed to recognize the alphanumeric characters on the license plate of the determined preceding vehicle, the preceding vehicle determination unit is configured to compute a second evaluation value according to a difference between a currently detected shape of the determined preceding vehicle and a previously detected shape of the determined preceding vehicle, the second evaluation value being taken into account when the determined preceding vehicle is corrected or authenticated by the preceding vehicle determination unit.

Preferably, the preceding vehicle determination unit is configured to compute a third evaluation value according to a difference between a currently detected position of the determined preceding vehicle and a previously detected position of the determined preceding vehicle, the third evaluation value being taken into account when the determined preceding vehicle is corrected or authenticated by the preceding vehicle determination unit.

Preferably, the preceding vehicle determination unit is configured to compute a fourth evaluation value according to a difference between a currently detected size of the determined preceding vehicle and a previously detected size of the determined preceding vehicle, the fourth evaluation value being taken into account when the determined preceding vehicle is corrected or authenticated by the preceding vehicle determination unit.

According to a particularly preferred embodiment of the present invention, a weighted sum of the first or the second evaluation value, the third evaluation value and the fourth evaluation value is taken into account when the determined preceding vehicle is corrected or authenticated by the preceding vehicle determination unit.

Thereby, the process of authenticating the preceding vehicle can be accomplished in a particularly efficient manner.

According to a certain aspect of the present invention, when the determined preceding vehicle is not authenticated by the preceding vehicle determination unit, the preceding vehicle determination unit is configured to select from the detected objects at least one candidate for the designated preceding vehicle which is located closest to the estimated position of the determined preceding vehicle.

Thereby, even when the adaptive cruise control device loses track of the preceding vehicle to be followed, the correct vehicle to be followed can be quickly identified by looking for a mostly likely candidate in an efficient manner.

The present invention thus provides an adaptive cruise control device that can reduce the time required for the authentication process, and correctly authenticate the preceding vehicle.

BRIEF DESCRIPTION OF THE DRAWING(S)

FIG. 9 is a diagram illustrating a third scenario corresponding to the second control flow shown in FIG. 4;

DESCRIPTION OF THE PREFERRED EMBODIMENT(S)

A preferred embodiment of the present invention is described in the following with reference to the appended drawings.

Figure 1:
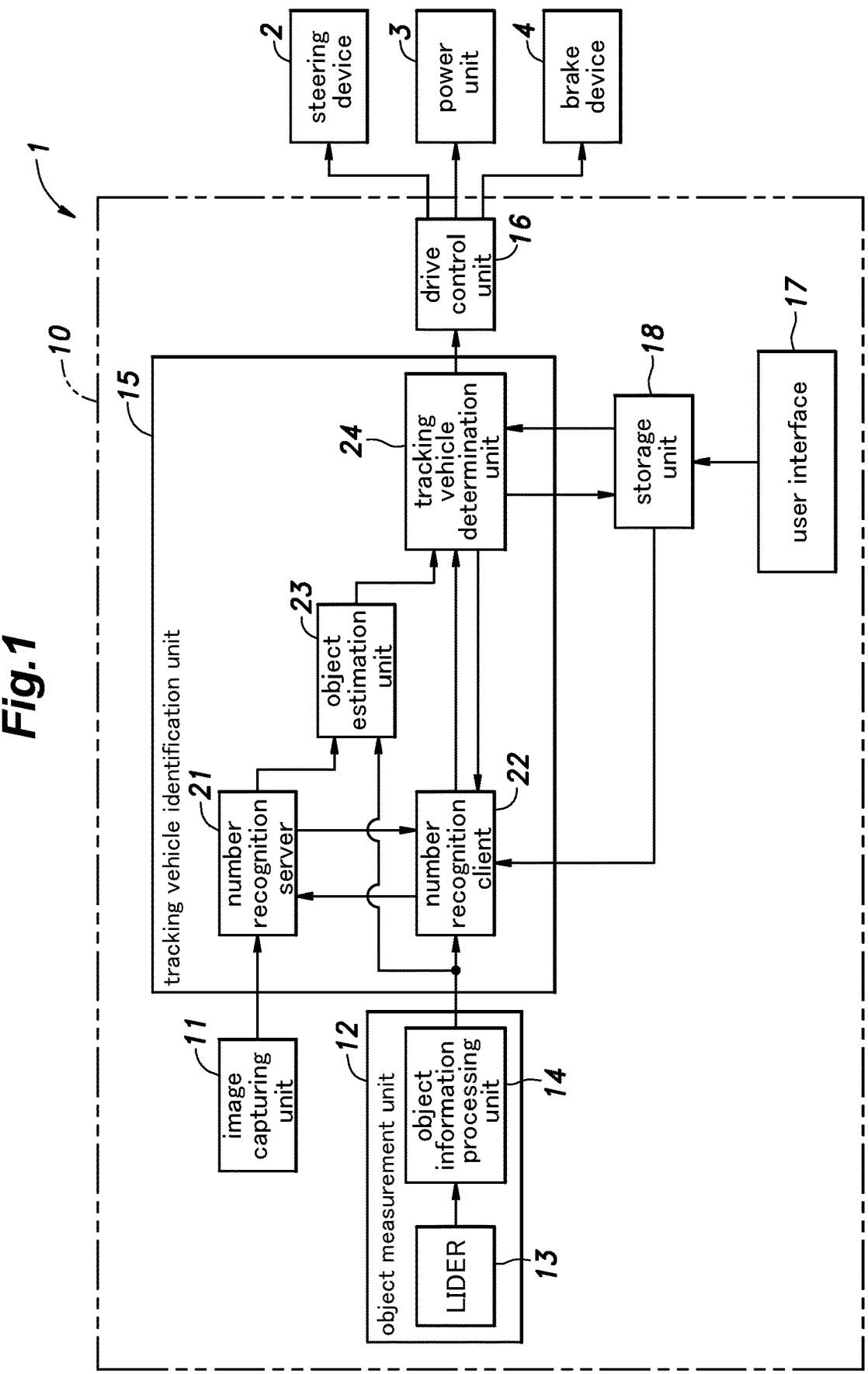
FIG. 1 is a block diagram of a vehicle incorporated with an adaptive cruise control device according to an embodiment of the present invention.

FIG. 1 is a block diagram of a vehicle incorporated with an adaptive cruise control device 10 according to an embodiment of the present invention. As shown in FIG. 1, the vehicle 1 includes a steering device 2 for steering steerable road wheels (front wheels), a power unit 3 for propelling the vehicle by using a drive source (not shown in the drawings) such as an internal combustion engine and an electric motor, and a brake device 4 for decelerating the vehicle by applying a frictional brake force and/or a regenerative brake force to the road wheels. The vehicle 1 further includes an adaptive cruise control device 10 (a vehicle following control device) for controlling the steering device 2, the power unit 3 and the brake device 4 so as to cause an own vehicle 1 to follow a designated preceding vehicle.

The adaptive cruise control device 10 may be operated in such a way that the own vehicle follows a preceding vehicle at a relatively small distance (a platoon cruise control) or the own vehicle follows a preceding vehicle at a safe distance (a regular adaptive cruise control). When there is no preceding vehicle to follow or no selection is made to follow a preceding vehicle, the own vehicle cruises automatically at a set speed or under manual control. Also, under certain conditions, the own vehicle cruises under a semi-automatic control. For instance, when the preceding vehicle has changed lanes or when the adaptive cruise control device 10 has lost the preceding vehicle, the adaptive cruise control device 10 may warn the vehicle operator to take over the control of the vehicle, or cause the vehicle 1 to slow down and park on a roadside.

The adaptive cruise control device 10 is provided with an image capturing unit 11 consisting of a camera having an imaging device such as CCD and CMOS for capturing the image of the view ahead of the own vehicle 1, and an object measurement unit 12 for detecting objects located ahead of the own vehicle 1, assign an ID to each detected object and measure the direction and the distance to each detected object.

The image capturing unit 11 is fixed to the vehicle body, and digitally captures a forward view of the own vehicle 1 (so as to cover an imaging area ranging across a prescribed horizontal view angle and a prescribed vertical view angle). In other words, the image capturing unit 11 continuously captures an image of a front area at a prescribed resolution (the number of vertical pixels×the number of horizontal pixels), and at a prescribed speed (the number of frames/second). The captured image may contain objects in varying distances. However, there is a certain region or an image capturing area A1 (indicated in FIG. 6) in the captured image for the image capturing unit 11 to be able to extract a license plate, and recognize alphanumeric characters in the license plate. The image capturing area A1 becomes larger as the resolution power of the image capturing unit 11 increases. On the other hand, as the resolution power of the image capturing unit 11 increases, the resulting increase in the amount of data to be process causes an increase in the amount of time required for processing the image data.

The object measurement unit 12 includes a LIDAR 13 (Light Detection and Ranging or Laser Imaging Detection and Ranging) that scans a laser beam to detect the presence of objects in front of the vehicle 1, and indicates the distance and the direction to each region that has reflected the laser beam, and an object information processing unit 14 that processes object information such as ID, position, size, and velocity of each detected point according to the output from the LIDAR 13. The LIDAR 13, which may consist of a two-dimensional or three-dimensional LIDAR such as a scan LIDAR and a phase array LIDA, irradiates pulsed laser light to a prescribed scan region (a region covering a prescribed horizontal scan angle and a prescribed vertical scan angle), and receives the laser light reflected by the objects in the front. The scan region (A2) of the LIDAR 13 is wider than the view range (A1) of the image capturing unit 11 in both horizontal and vertical directions. Based on the direction of the received reflected laser light and the time required for the laser light to travel to and from each detected point, the LIDAR 13 records the direction and the distance to each detected object as a corresponding point in a 3D map. The object information processing unit 14 recognizes each object consisting of a group of points based on the information of the points or regions detected by the LIDAR 13, and assigns an ID to each detected object. Further, the object information processing unit 14 computes object information including the position (direction and distance), size, and velocity (velocity relative to the vehicle 1) of each object based on the information of the corresponding point group of the object having a unique ID assigned thereto.

The LIDAR 13 is capable of detecting objects located within a prescribed measurement area A2 (a planar area shown in FIG. 6), and this area is larger than the image capturing area A1 of the image capturing unit 11. More specifically, the measurement area A2 of the LIDAR 13 is wider than the image capturing area A1 of the image capturing unit 11 in terms of the view angle, and the distance at which the LIDAR 13 can detect an object is greater than the distance at which the alphanumeric characters of the license plate of the preceding vehicle can be recognized by the image capturing unit 11. Therefore, the measurement area A2 of the LIDAR 13 includes an area which is located outside of either lateral side and on far side of the image capturing area A1.

The adaptive cruise control device 10 includes a preceding vehicle identification unit 15 that identifies a vehicle to be followed according to the outputs from the image capturing unit 11 and the object measurement unit 12, and a drive control unit 16 that controls the steering device 2, the power unit 3 and the brake device 4 so as to follow the vehicle identified by the preceding vehicle identification unit 15. The adaptive cruise control device 10 further includes a user interface 17 that receives an operation to designate the vehicle to be followed, and a storage unit 18 that stores information on the vehicle to be followed (such as the ID, the alphanumeric characters of the license plate, the position and the size of the vehicle) designated by an operation from the user interface 17.

The preceding vehicle identification unit 15, the drive control unit 16, and the storage unit 18 are functional units formed by electronic circuitry including a CPU, a RAM, a ROM, and the like. More specifically, these functional units are realized by the operation of the CPU which reads data and application software from the associated memory, and operates under the computer program contained in application software.

The preceding vehicle identification unit 15 includes various functional units which are described in the following. The output (image information) of the image capturing unit 11 is forwarded to a number recognition server 21 of the preceding vehicle identification unit 15. The output (object information) of the object measurement unit 12 is forwarded to a number recognition client 22 and an object estimation unit 23 of the preceding vehicle identification unit 15.

The number recognition server 21 is a license plate recognition unit that processes the acquired image to extract a license plate and recognizes (reads) alphanumeric characters (plate number) of the extracted license plate in response to a number recognition request from the number recognition client 22. In this conjunction, the process of searching for a license plate by image processing and the process of recognizing the numbers from the extracted license plate are collectively referred to as number recognition in the following disclosure. The number recognition may be performed by a known method such as, for example, the method described in JP4760363B. A license plate often indicates regional information and vehicle classification information by using letters or characters in addition to alphanumeric characters intended to identify each particular vehicle. In the following disclosure, such letters and characters will be simply referred to as "plate numbers" for the convenience of description. The number recognition server 21 forwards recognition number information including each incidence of extracting a license plate, and the plate numbers recognized from the extracted license plate to the number recognition client 22 and the object estimation unit 23. The process of extracting a license plate will be discussed in a latter part of the disclosure.

Figure 6:
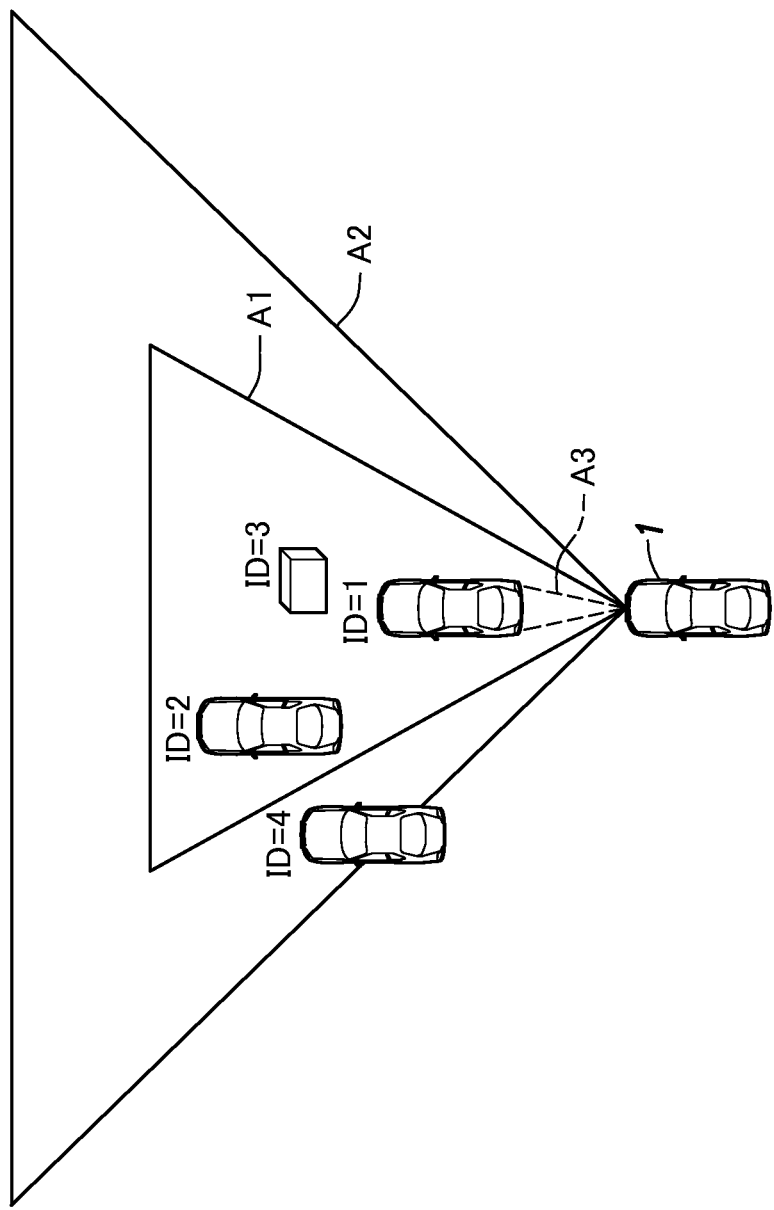
FIG. 6 is a diagram illustrating a scenario corresponding to a first control flow shown in FIG. 4.

The number recognition client 22 (alphanumeric character matching unit) designates a certain area of each detected object where a license plate is expected to be located (image recognition area A3) (see FIG. 6). This area may be selected as a laterally middle area of the detected object having a prescribed width and a prescribed vertical range. The number recognition client 22 forwards information on each detected object associated with a unique ID, and the designated image recognition area A3 for each detected object as a number recognition request. Upon receiving the number recognition request, the number recognition server 21 recognizes the plate number of the corresponding object, and returns the result of the image recognition to the number recognition client 22. This operation is repeated cyclically, and the image recognition may be totally complete, partially complete or totally incomplete depending on the optical and other conditions.

The number recognition client 22 receives the processing cycle time, the control state, the ID of the vehicle to be followed, and a number matching request from a preceding vehicle determination unit 24 of the preceding vehicle identification unit 15, and receives the plate number of the vehicle to be followed from the storage unit 18. The number recognition client 22 then matches the recognized plate number with the plate number of the vehicle to be followed which was originally designated when an adaptive cruise control is initiated.

The processing cycle time of the number recognition client 22 thus includes a processing cycle time for number recognition and number matching. The number recognition client 22 sends a number recognition request to the number recognition server 21 and performs number matching in this processing cycle time. The details of number matching will be described in a latter part of the disclosure. The control state mentioned above consists of information indicating the state of the tracking control (adaptive cruise control) and the specific state of the vehicle to be followed. The number recognition client 22 may change the image processing area according to the control state.

How the image processing area is designated and changed is briefly described in the following. More detailed discussion on this subject matter will be found in a latter part of the disclosure. If the control state of the preceding vehicle determination unit 24 indicates that the tracking target or the vehicle to be followed is lost, the number recognition client 22 selects candidates for the tracking target, and assigns an ID to each candidate according to the object information provided by the object measurement unit 12 and depending on the position of the candidate, the preceding vehicle determination unit 24 may determine the particular candidate as being unsuitable as the tracking target or the vehicle to be followed. The tracking target is determined to be lost when the object having a certain ID assigned thereto has disappeared from the object information, and when the tracking object is determined to be unsuitable as the tracking vehicle by the preceding vehicle determination unit 24.

More specifically, the number recognition client 22 sets the candidate ranking so that the objects become higher in ranking in the order of proximity to the position of each candidate to the estimated position of the vehicle to be followed according to the previous determined position and speed of the vehicle to be followed as determined by the object estimation unit 23. Then, the number recognition client 22 designates the image recognition area for the object of the highest ranking for the number recognition server 21 to perform the required plate number recognition. If the number recognition server 21 returns a complete matching or a partial matching of the recognized plate number with the stored plate number, the currently detected vehicle to be followed is maintained.

If the number recognition client 22 fails in the matching of the plate numbers, this information is forwarded to the preceding vehicle determination unit 24 so that the object of the next highest ranking is designated by the preceding vehicle determination unit 24 for the number recognition client 22 to renew the plate number matching with respect to the newly designated object.

The preceding vehicle determination unit 24 computes a first evaluation value X1 according to the degree of matching between the plate numbers supplied by the number recognition client 22 and the storage unit 18 as a numerical value. The image recognition may allow only some of the alphanumeric characters to be recognized. If the recognized alphanumeric characters match with those stored in the storage unit 18, the plate number matching may be considered to be successful, and the current vehicle to be followed may be maintained.

If there is any disagreement in the recognized alphanumeric character with the corresponding alphanumeric character in the storage unit 18, the matching may be considered as unsuccessful, and the preceding vehicle determination unit 24 may request the number recognition client 22 to look for the next candidate. Alternatively, the preceding vehicle determination unit 24 may request the number recognition client 22 to look for the next candidate only after a prescribed number of unsuccessful matching events have occurred.

When the number recognition server 21 is unable to recognize the plate number (such as when the detected vehicle is outside the image capturing area), and an estimation is received from the object estimation unit 23, the preceding vehicle determination unit 24 compares the estimated vehicle as estimated by the object estimation unit 23 with the detected vehicle as measured by the object measurement unit 12. Based on the degree of agreement in shape between the estimated vehicle and the detected vehicle, a second evaluation value X2 is determined. The second evaluation value X2 gives a measure of the genuineness of the detected object.

Further, the preceding vehicle determination unit 24 computes a third evaluation value X3 according to the difference between the position of the vehicle as measured by the object measurement unit 12 and the position of the object as estimated by the object measurement unit 12, and computes a fourth evaluation value X4 according to the difference between the size of the object as measured by the object measurement unit 12 and the size of the object as estimated by the object measurement unit 12. Furthermore, when the number recognition server 21 is able to successfully recognize the plate number, the preceding vehicle determination unit 24 computes the overall evaluation value X based on the first evaluation value X1, the third evaluation value X3 and the fourth evaluation value X4. When the number recognition server 21 is unable to recognize the plate number, the preceding vehicle determination unit 24 computes the overall evaluation value X based on the second evaluation value X2, the third evaluation value X3 and the fourth evaluation value X4.

The preceding vehicle determination unit 24 determines the object associated with the ID currently assigned to the vehicle to be followed to be correct when the overall evaluation value X is greater than a prescribed threshold value Xth. The overall evaluation value X is relied upon by the preceding vehicle determination unit 24 although the correct vehicle to be followed is ultimately determined by the matching of the plate number with the plate number stored in the storage unit 18 in the most case. The preceding vehicle determination unit 24 monitors the control state of the adaptive cruise control according to the overall evaluation value, and may rewrite the ID of the vehicle to be followed stored in the storage unit 18 when so required. The determination result of the preceding vehicle determination unit 24 is forwarded to the number recognition client 22 as a part of the information on the control state.

The user interface 17 may be of any configuration as long as it is configured to allow the vehicle to be followed to be designated by the user. For example, the user interface 17 may be an input unit (such as a keyboard on a touch panel) for inputting the ID of the vehicle to be followed, or a selection button configured to allow the vehicle to be followed to be selected from the graphic display on the screen of a display. The storage unit 18 stores the ID and the plate number of the vehicle to be followed as received from the preceding vehicle determination unit 24.

When the user designates the vehicle to be followed via the user interface 17, the storage unit 18 stores the ID of the object identified as the vehicle to be followed, and the plate number of the license plate detected on the vehicle to be followed by the number recognition server 21. Alternatively, the storage unit 18 may store the plate number entered from the user interface 17 as the plate number of the vehicle to be followed, and the corresponding ID number is then forwarded from the preceding vehicle determination unit 24 to the storage unit 18.

The preceding vehicle determination unit 24 starts vehicle tracking control in response to the designation of the vehicle to be followed via the user interface 17, and cancels the vehicle tracking control in response to the cancel operation performed on the user interface 17. Further, the user may change the vehicle to be followed via the user interface 17. At such a time, the preceding vehicle determination unit 24 rewrites the ID of the vehicle to be followed and the corresponding plate number accordingly. It can also happen that the preceding vehicle determination unit 24 totally loses the vehicle to be follow or otherwise becomes unable to identify the vehicle to be followed. In such a case also, the vehicle tracking control is canceled.

During execution of the adaptive cruise control, the drive control unit 16 receives the ID of the object determined to be a vehicle to be followed by the preceding vehicle determination unit 24 as an ID of the vehicle to be followed, and based on the object information provided by the object measurement unit 12, controls the steering device 2, the power unit 3 and the brake device 4 so as to follow the object (the vehicle to be followed) associated with the ID of the vehicle to be followed.

Figure 2:
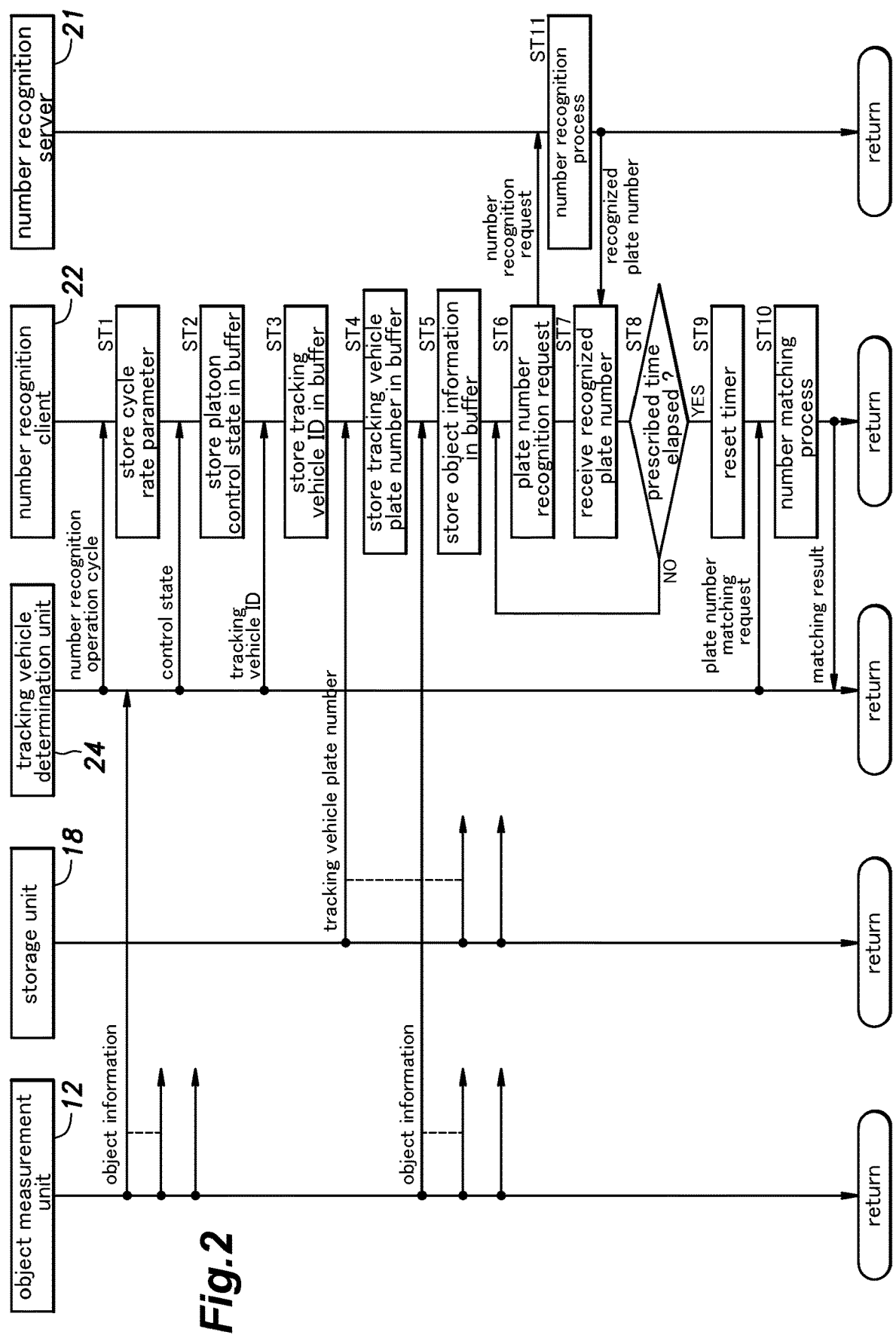
FIG. 2 is a flowchart showing a control process executed by the adaptive cruise control device.

FIG. 2 is a flowchart showing the process executed by the adaptive cruise control device 10 shown in FIG. 1. This flowchart primarily shows the operation of the number recognition client 22 which is carried out in cooperation with other elements of the adaptive cruise control device 10. As shown in FIG. 2, the number recognition client 22 receives a command from the preceding vehicle determination unit 24 to determine the duration of each processing cycle or the cycle rate of the operation of the number recognition client 22, and stores the cycle rate as a cycle rate parameter (step ST1). Typically, a shorter cycle rate is selected when following the preceding vehicle at a short distance as is the case with platoon cruising. At the start of each operation cycle, a timer is set.

At the same time, the preceding vehicle determination unit 24 commands the selected operation mode such as platoon cruising or other modes of adaptive cruise control to the number recognition client 22 (step ST2). The number recognition client 22 then receives the ID of the vehicle to be followed from the preceding vehicle determination unit 24, and temporarily stores the received ID of the vehicle to be followed in the buffer memory (step ST3). When the number recognition client 22 receives the plate number of the vehicle to be followed from the storage unit 18 (step ST4). The number recognition client 22 also receives object information gathered by the object measurement unit 12 (step ST5). The foregoing steps may be performed in any desired order.

Thereafter, the number recognition client 22 sends a number recognition request to the number recognition server 21 (step ST6). Upon receiving the number recognition request, the number recognition server 21 performs a number recognition process (step ST11), and returns the number recognition result to the number recognition client 22. After receiving the number recognition result from the number recognition server 21 (step ST7), the number recognition client 22 determines if a prescribed time period set for the number recognition has elapsed (step ST8). If the prescribed time period has not elapsed (No in step ST8), the process flow returns to step ST6.

If the prescribed time period has elapsed (Yes in step ST8), the timer for the prescribed time period is reset, and the program flow advances to a number matching process in response to a number matching request from the preceding vehicle determination unit 24 (step ST10). The result of the number matching process is then returned to the preceding vehicle determination unit 24. This concludes the current operation cycle of the number recognition client 22.

During the above process, the object measurement unit 12 sends the object information to the preceding vehicle determination unit 24, and the storage unit 18 sends the plate number of the vehicle to be followed not only to the number recognition client 22 but also to the preceding vehicle determination unit 24. The object measurement unit 12, the storage unit 18, the preceding vehicle determination unit 24, and the number recognition server 21 also repeat the above processing for each processing cycle.

Figure 3:
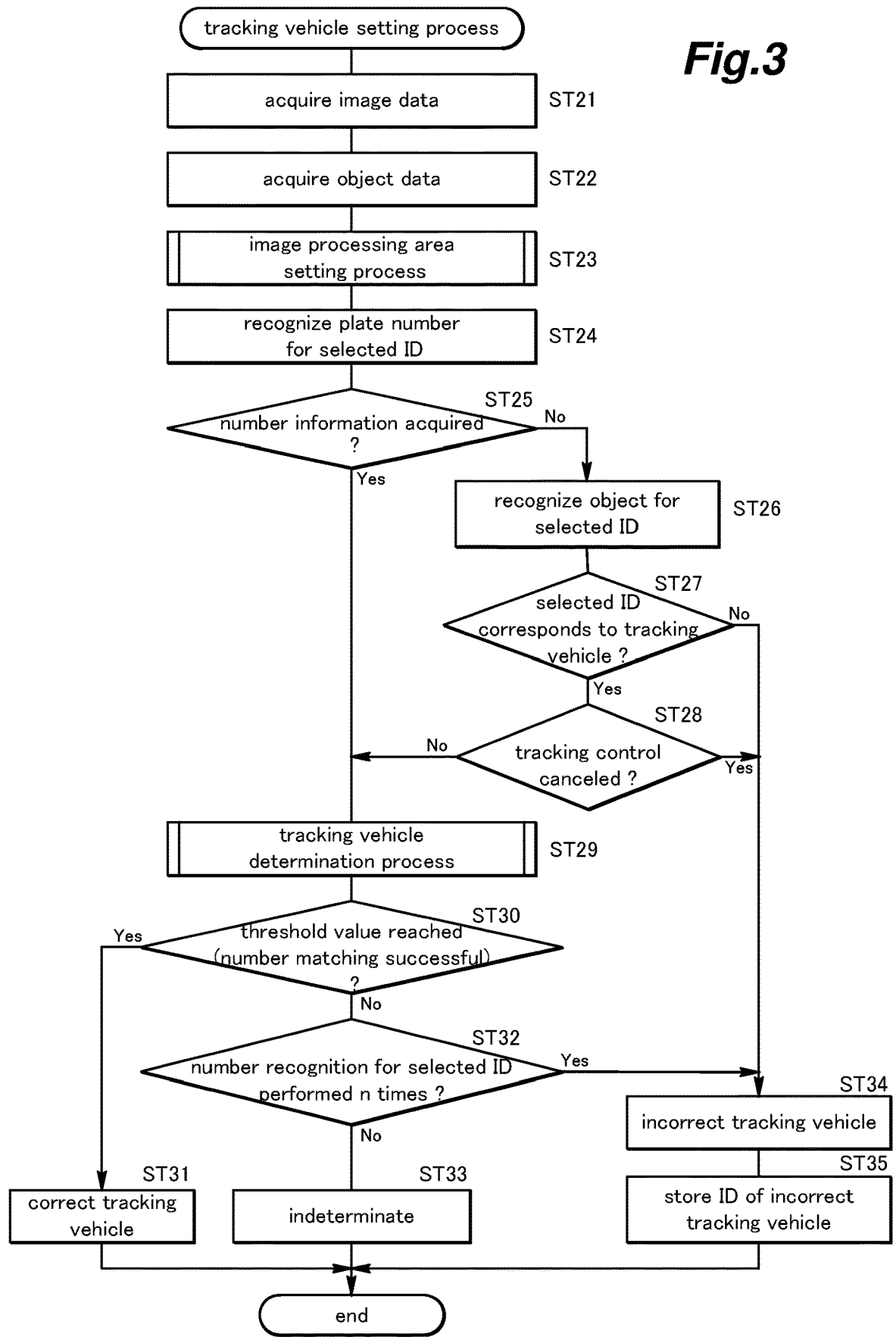
FIG. 3 is a flowchart showing a preceding vehicle identification process executed by a preceding vehicle identification unit of the adaptive cruise control device.

FIG. 3 is a flowchart showing the process of determining the vehicle to be followed executed by the preceding vehicle identification unit 15 shown in FIG. 1. As shown in FIG. 3, the preceding vehicle identification unit 15 executes the process described in the following for each processing cycle determined in step ST1 of FIG. 2. The process performed by the preceding vehicle identification unit 15 is described in the following in relation with the functional units shown in FIG. 1. The process steps described below may be performed in any other order other than that given in the following description.

First of all, the number recognition server 21 acquires image data from the image capturing unit 11 (step ST21). The number recognition client 22 acquires object information from the object measurement unit 12 (step ST22). The object information may include information on a plurality of detected objects such as the ID given to each detected object, the distance and direction to the object, and the size of the object. The number recognition client 22 performs an image processing area setting process (step ST23). Details of the image processing area setting process are described in the following with reference to FIG. 4.

Figure 4:
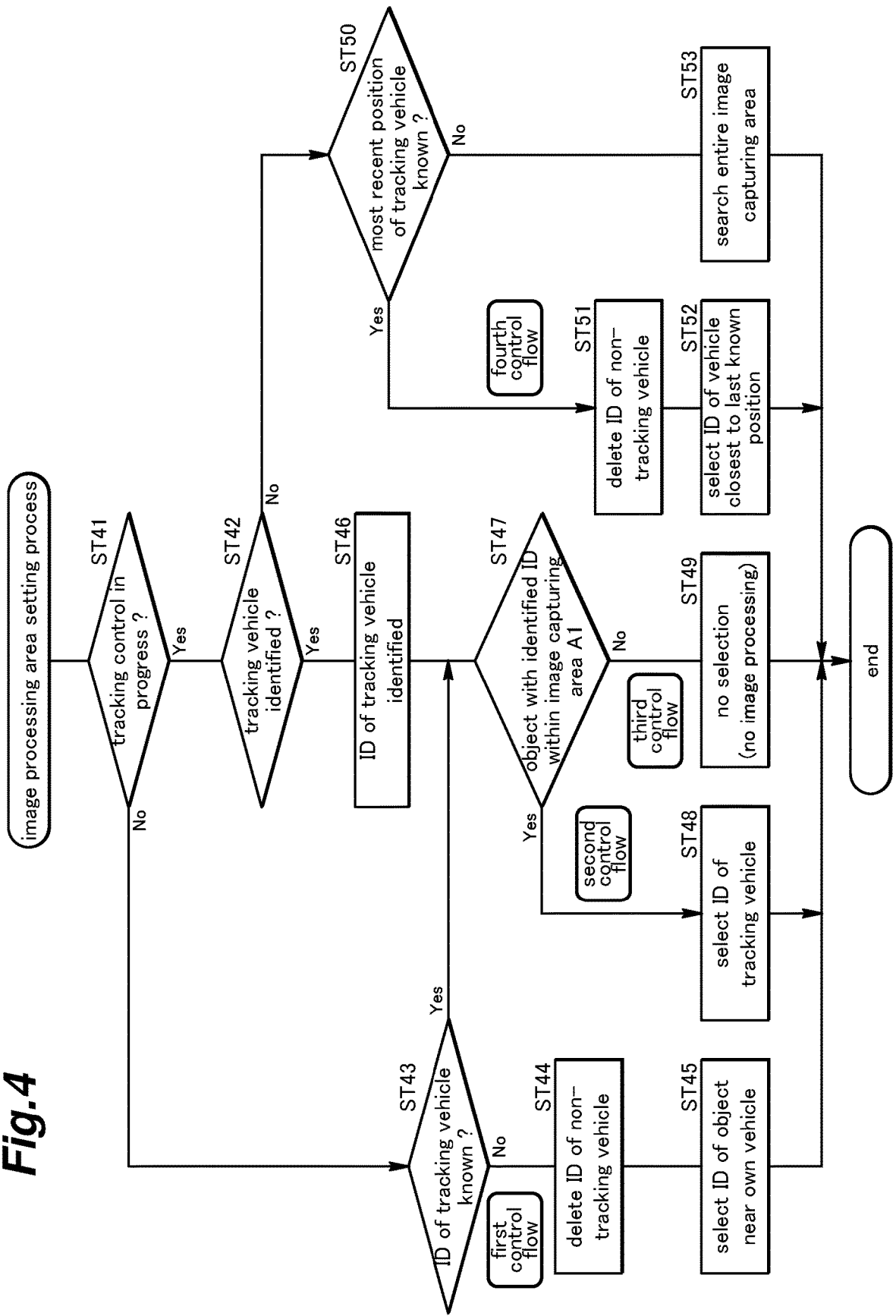
FIG. 4 is a flowchart showing a license plate image processing region determination process shown in FIG. 3.

FIG. 4 is a flowchart showing the image processing area setting process shown in FIG. 3. The number recognition client 22 determines if the adaptive cruise control (by which the own vehicle follows a preceding vehicle at a prescribed distance) is being performed (step ST41). If the adaptive cruise control is not being performed (No in step ST41), the control process advances to step ST43.

In step ST43, the number recognition client 22 determines if the IDs of the vehicles that are captured by the object measurement unit 12 are known. If a new object with a new ID is detected, such an object is added to the storage unit 18. If there is any detected object that is not judged to be a vehicle, the ID for this particular object is excluded from consideration, or disregarded (step ST44). An object is not judged to be a vehicle from various attributes of the detected object such as when the object is stationary or moving across the road. Then, the ID of the vehicle closest to the own vehicle is selected as a candidate for a vehicle to be followed once an adaptive cruise control is initiated (step ST45). The control flow of step ST43 to step ST45 is referred to as a first control flow.

FIG. 6 is a diagram illustrating a situation where the first control flow takes place. It can be noted that an image recognition area A3 is indicated in this diagram. The number recognition client 22 designates the image recognition area A3 for each detected object, and forwards this information to the number recognition server 21 to be subjected to an image recognition process to recognize the alphanumeric characters from the image recognition area A3.

In this case, the objects assigned with ID=1-4 that are within the measurement area A2 are detected by the object measurement unit 12, but the object assigned with ID=3 is excluded from consideration as this particular object does not demonstrate attributes of a vehicle. The objects assigned with ID=1 and 2 are within the image capturing area A1 so that the plate numbers of these objects (vehicles) can be recognized, and the closest vehicle assigned with ID=1 is selected as a candidate for a vehicle to be followed. On the other hand, the vehicle assigned with ID=4 is outside the image capturing area A1 so that the plate number of this vehicle cannot be recognized.

Referring back to FIG. 4, if the adaptive cruise control is being performed (Yes in step ST41), the number recognition client 22 determines if the vehicle to be followed is determined (step ST42). If the adaptive cruise control is in progress, and the vehicle to be followed is determined (Yes in step ST41, and Yes in step ST42), the control process advances to step ST46 where the number recognition client 22 acquires and recognizes the ID of the vehicle to be followed from the preceding vehicle determination unit 24, and determines if the vehicle to be followed is present in the image capturing area A1 of the image capturing unit 11 (step ST47). This process step is performed also when it is determined Yes in step ST43.

If the vehicle to be followed with a known ID is in the image capturing area A1 (Yes in step ST47), the number recognition client 22 selects the ID of the vehicle to be followed as already selected (step ST48). If there is no object in the image capturing area A1 (No in step ST47), since the number recognition process cannot be performed, the ID is not selected (step ST49). The control flow leading to step ST48 is referred to as a second control flow, and the control flow leading to step ST49 is referred to as a third control flow.

Figure 7:
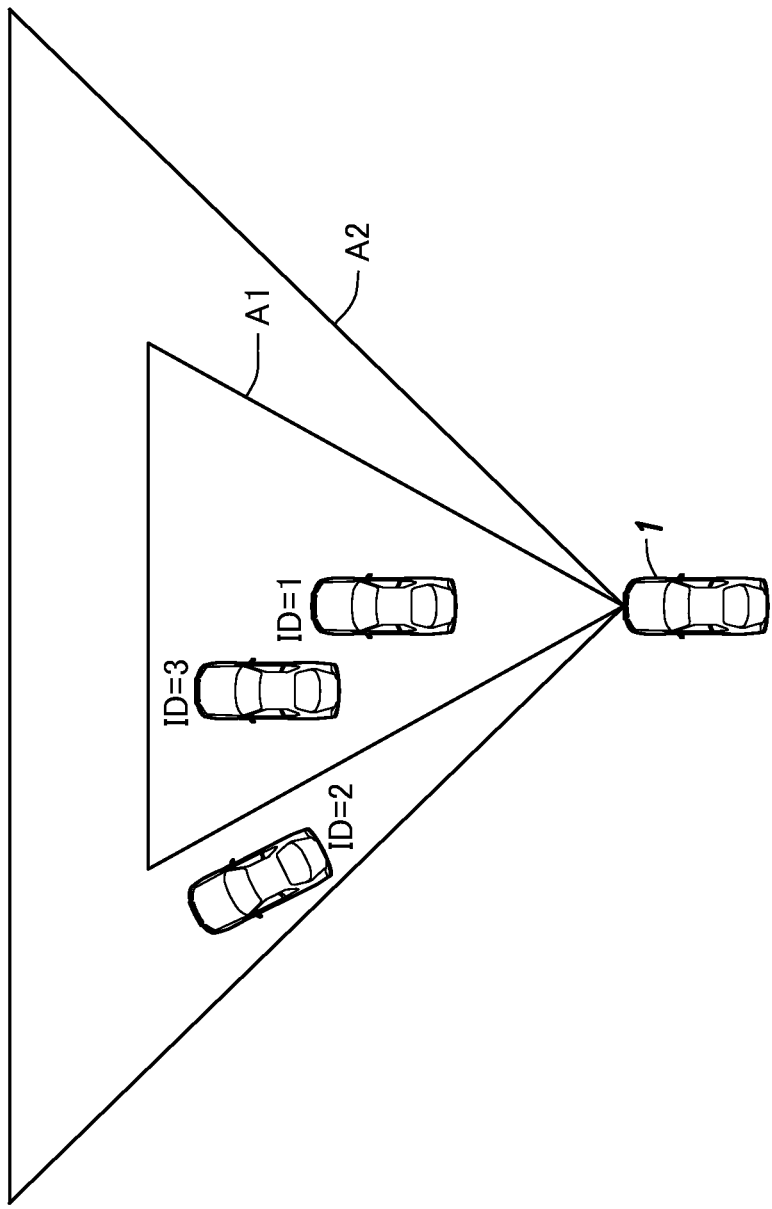
FIG. 7 is a diagram illustrating a first scenario corresponding to a second control flow and a third flow shown in FIG. 4.

FIG. 7 is a diagram illustrating a first situation where the second control flow and the third control flow take place. If the ID of the vehicle to be followed is 1 or 3, the number recognition client 22 continues to retain the ID of the vehicle to be followed (the second control flow). As for the object located outside the image capturing area A1, or the object assigned with ID=2, the number recognition process cannot be performed so that the number recognition client 22 does not select this vehicle (the third control flow).

Figure 8:
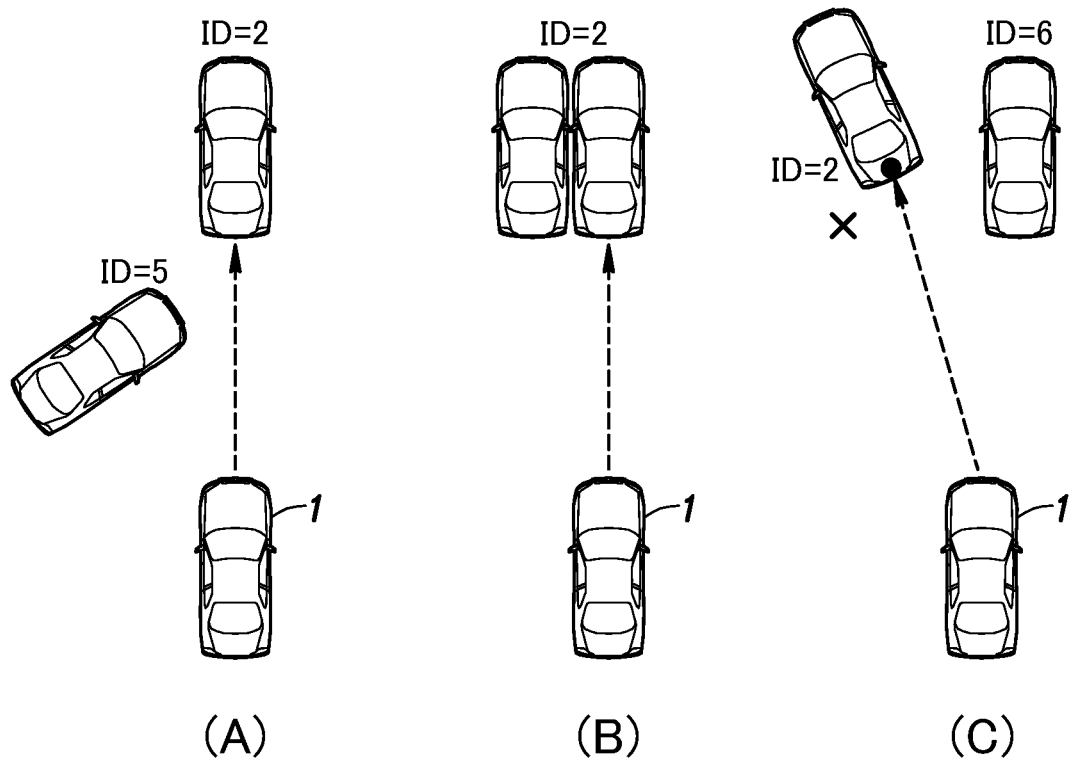
FIG. 8 is a diagram illustrating a second scenario corresponding to the second control flow shown in FIG. 4.

FIG. 8 is a diagram illustrating a second situation where the second control flow takes place. As shown in (A) of FIG. 8, while the number recognition client 22 holds ID=2 as the ID of the vehicle to be followed, another vehicle (ID=5) approaches the vehicle to be followed. As shown in (B) of FIG. 8, the other vehicle (ID=5) comes so close to the vehicle to be followed (ID=2) that the object measurement unit 12 erroneously recognizes the two vehicles as one object, and holds ID=2 while erasing ID=5. After that, as shown in (C) of FIG. 8, when the other vehicle which was initially assigned with ID=5 separates from the vehicle to be followed, the object measurement unit 12 erroneously assigns ID=2 to the other vehicle. At the same time, the vehicle to be followed which originally had ID=2 is erroneously recognized as a newly detected vehicle, and a new ID=6 is assigned to the vehicle (which is originally intended to be followed). In such a case, the number recognition client 22 still considers that the object measurement unit 12 correctly recognizes the vehicle to be followed, but in reality, the vehicle different from the vehicle to be followed is incorrectly recognized as a vehicle to be followed.

FIG. 9 is a diagram illustrating a third situation where the second control flow takes place. As shown in (A) of FIG. 9, suppose that the number recognition client 22 holds ID=2 as the ID of the vehicle to be followed. Then, as shown in (B) of FIG. 9, an object other than a traveling vehicle is detected. The vehicle to be followed comes so close to this newly detected object, the object measurement unit 12 erroneously recognizes the vehicle to be followed and the stationary object as one object which retains ID=2, and deletes ID=5. Thereafter, as shown in (C) of FIG. 9, as the vehicle to be followed passes the object (originally assigned with ID=5), the object measurement unit 12 erroneously identifies the object with ID=2 as the vehicle to be followed while a new ID=6 is assigned to the vehicle which is in fact to be followed. Even in such a case, since the number recognition client 22 considers that the object measurement unit 12 has correctly identified the vehicle to be followed, the second control flow is performed, but in reality the object different from the vehicle to be followed is erroneously followed.

Referring back to FIG. 4 again, when the adaptive cruise control is in progress, and the vehicle to be followed is not identified (Yes in step ST41, and No in step ST42), the program flow advances to step ST50. In step ST50, the number recognition client 22 determines if the most recent position of the vehicle to be followed is known. If the most recent position of the vehicle to be followed is known (Yes in step ST50), the number recognition client 22 excludes the IDs which are not determined to be a vehicle to be followed (including the vehicles which are not determined to be a vehicle to be followed in step ST34 which will be described hereinafter) for consideration (step ST51), and the ID of the object closest to the position occupied by the vehicle to be followed in the immediate past is selected (step ST52). The process of step ST51 is similar to the process of step ST44 described with reference to FIG. 6, and selects the candidates for the vehicle to be followed. The candidates are ordered according to the distance from the own vehicle, and an image recognition process is applied to the candidates in the determined order. The control flow of step ST49 to step ST52 is referred to as a fourth control flow.

Figure 10:
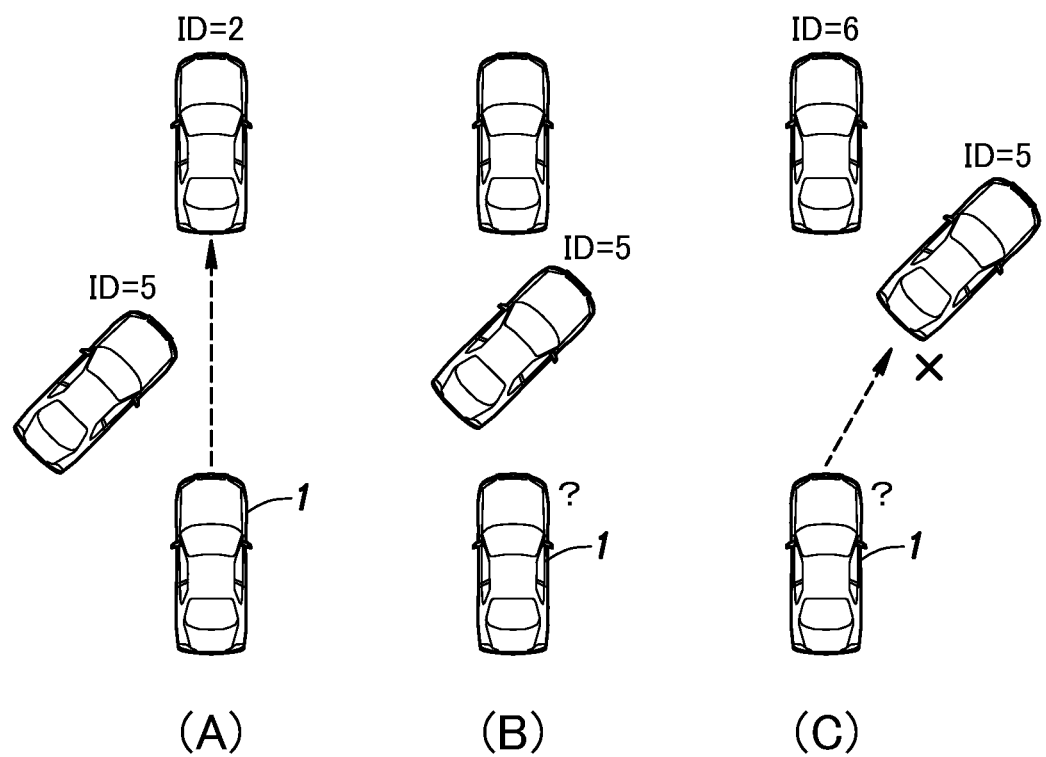
FIG. 10 is a diagram illustrating a first scenario corresponding to the third control flow shown in FIG. 4.

FIG. 10 is a diagram illustrating a first situation where the fourth control flow takes place. Suppose that the number recognition client 22 holds ID=2 as the ID of the vehicle to be followed, and another vehicle (ID=5) approaches the vehicle to be followed (ID=2) as shown in (A) of FIG. 10. If the other vehicle cuts in between the own vehicle and the vehicle to be followed as shown in (B) of FIG. 10, the object measurement unit 12 is unable to recognize the vehicle to be followed. As a result, ID=2 becomes lost. Then, as shown in (C) of FIG. 10, the other vehicle (ID=5) moves away, and ceases to be between the own vehicle and the vehicle to be followed. The vehicle to be followed is then detected by the object measurement unit 12, and is assigned with a new ID=6. In this case, the number recognition client 22 is unable to recognize the vehicle to be followed.

Further, as described with reference to FIGS. 8 and 9, in the second control flow leading to step ST48, the number recognition client 22 may recognize an incorrect object as the vehicle to be followed. In such a case, in a subsequent process of authenticating the plate number, the incorrect object is determined as such. As a result, the subsequent control cycle starts with the state where the number recognition client 22 does not retain the ID of any recognized vehicle to be followed so that the fourth control flow will be executed.

Referring back to FIG. 4, in step ST50, if the most recent position of the vehicle to be followed is not known (No in step ST50), the number recognition client 22 is unable to select a specific object that may be the vehicle to be followed. Therefore, the image processing process is required to be extended to the entire image capturing area A1.

Referring back to FIG. 3, the preceding vehicle determination process is described in the following. Following the image processing area setting process of step ST23, the number recognition server 21 searches the license plate in the set image processing area, and performs the number recognition process on the object associated with the selected ID (step ST24). The number recognition client 22 determines if the license plate information has been acquired (step ST25).

If the number information cannot be acquired (No in step ST25), the object estimation unit 23 performs object recognition on the object associated with the selected ID (step ST26). The object recognition in this case is performed so as to identify the kind of the object associated with the selected ID based on the distance and size information included in the object information. More specifically, the objection recognition identifies if the object associated with the selected ID is the vehicle to be followed or any other vehicle traveling ahead of the own vehicle. Thereafter, the preceding vehicle determination unit 24 determines if the object associated with the selected ID is the vehicle to be followed (step ST27). If it is indeed the case, it is determined if the tracking control is canceled according to the control state (step ST28).

In step ST25, if the number information is acquired (Yes in step ST25), or if the tracking control is canceled in step ST28 (No in step ST28), the preceding vehicle determination process is executed (Step ST29). Details of the preceding vehicle determination process are described in the following with reference to FIG. 5.

Figure 5:
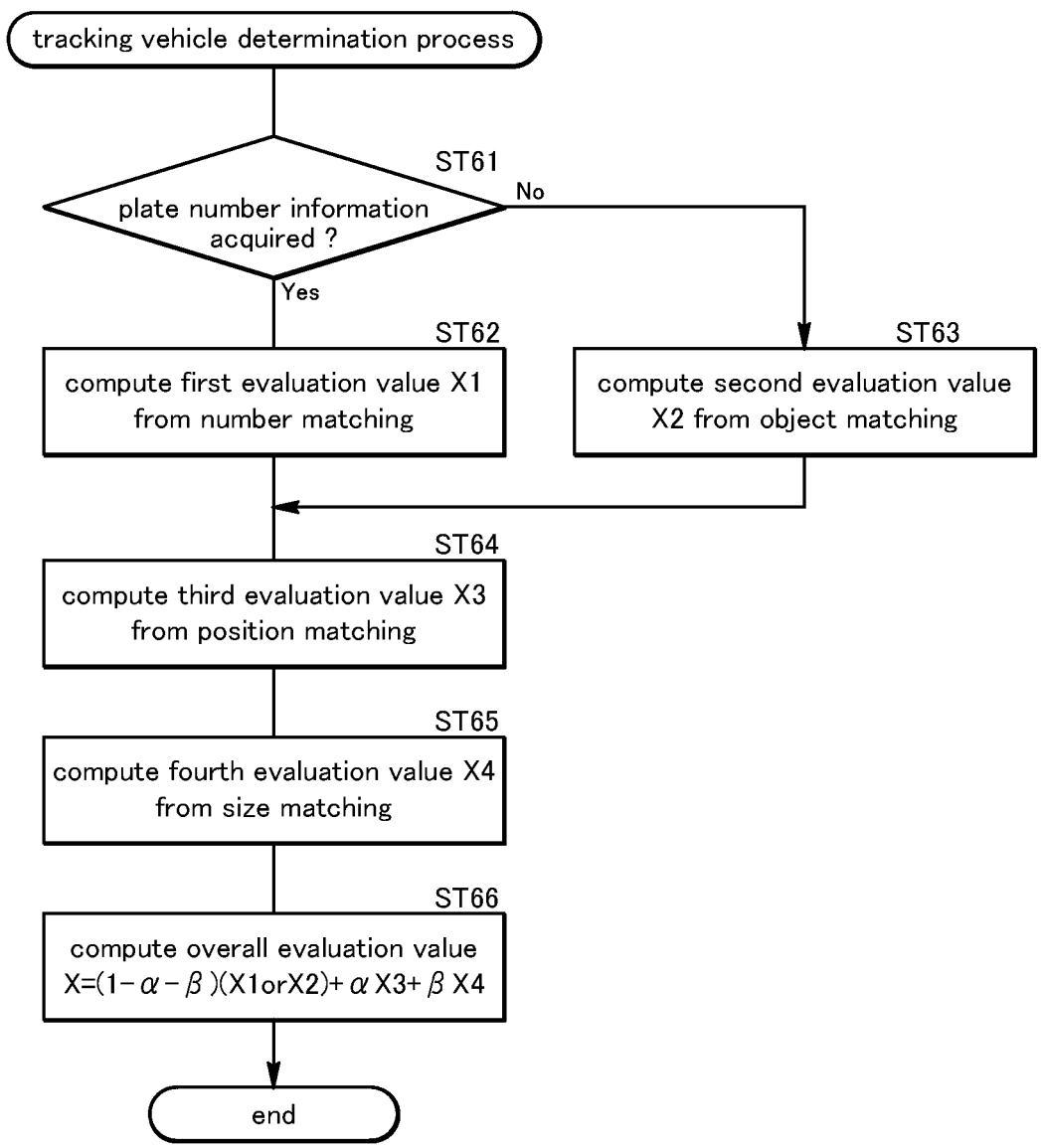
FIG. 5 is a flowchart showing a preceding vehicle determination process shown in FIG. 3.

As shown in the flowchart of FIG. 5, the preceding vehicle determination unit 24 determines if the plate number information can be acquired (step ST61).

If the plate number information can be acquired (Yes in step ST61), the process proceeds to step ST62 to evaluate the result of the number matching. More specifically, based on the plate number recognized by the number recognition server 21 and the plate number of the vehicle to be followed stored in the storage unit 18, the number recognition client 22 evaluates the degree of agreement between these two plate numbers, and generates a first evaluation value X1 of 0 to 100 depending on the degree of agreement.

If the plate number information has not been acquired (No in step ST61), the process proceeds to step ST63. In step ST63, the preceding vehicle determination unit 24 performs the object evaluation on the object associated with the selected ID based on the result of the object recognition performed by the object estimation unit 23, and computes the second evaluation value X2 according to the object evaluation result. The second evaluation value X2 is computed as a value of 0 to 100 depending on the objection evaluation result. The object evaluation estimates the shape of the object associated with the selected ID taking into account the moving speed of the object obtained from the previous measurement result of the object measurement unit 12, and compares the estimation result with the current measurement result of the object measurement unit 12 so that the degree of matching in shape between the previously detected object and the currently detected object.

Figure 11A:
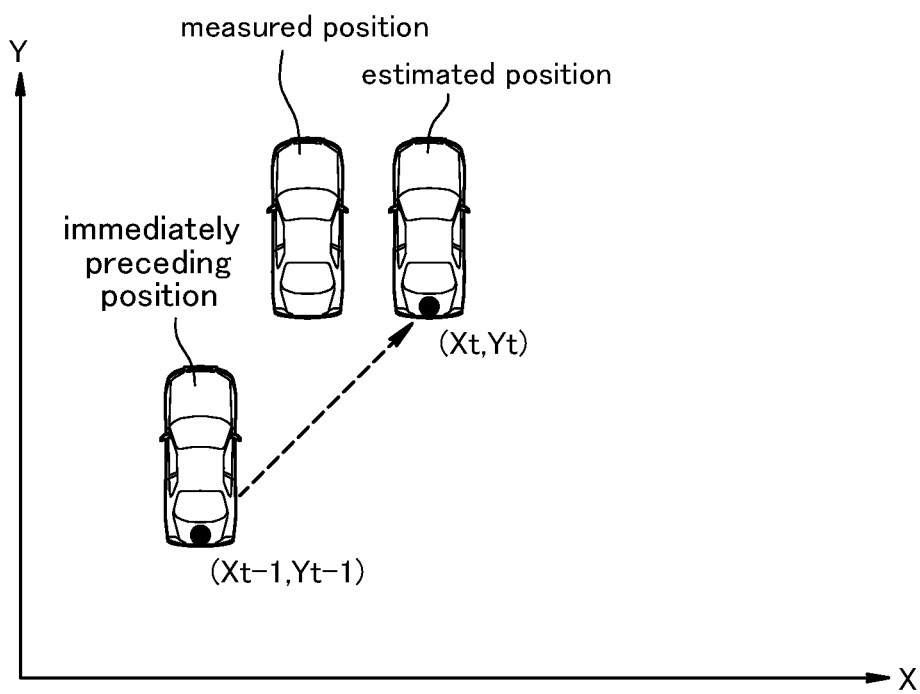
FIGS. 11A and 11B are diagrams illustrating a second scenario corresponding to a fourth control flow shown in FIG. 4.

Following the process step of either step ST62 or step ST63, the preceding vehicle determination unit 24 computes a third evaluation value X3 depending on the difference between the position of the object as detected by the object measurement unit 12 and the position of the object as estimated by the object estimation unit 23 (step ST64). As shown in FIG. 11A, the third evaluation value X3 gives a measure of agreement between the estimated position of the object and the measured (detected) position of the object, and is between 0 and 100 depending on the degree of agreement.

Figure 11B:
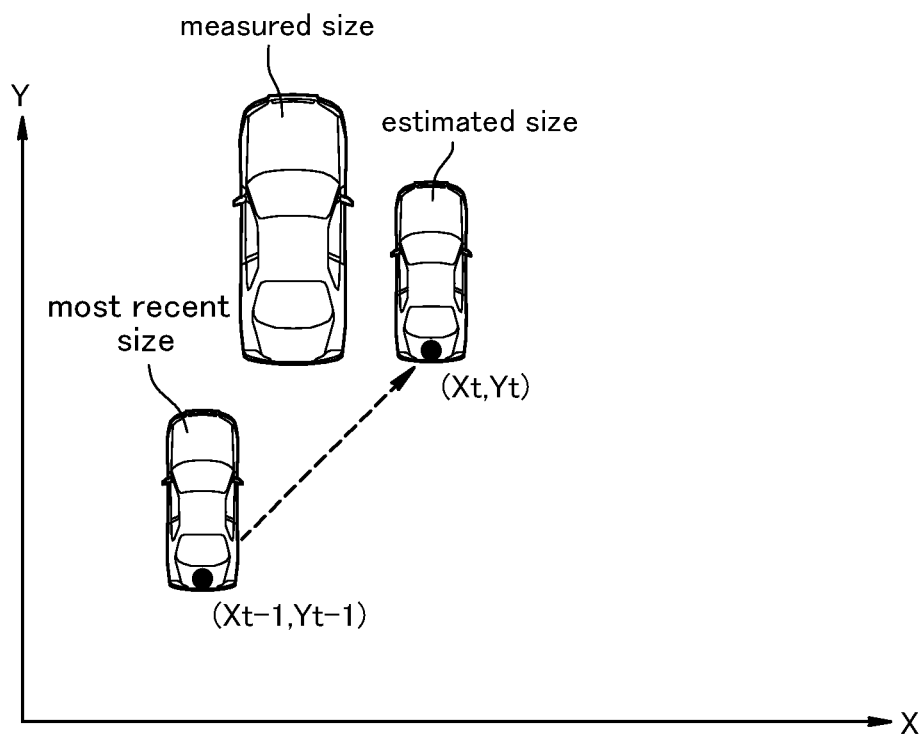

Thereafter, the preceding vehicle determination unit 24 computes the evaluation value according to the change in the size of the object, or, in other words, the difference between the size of the object measured by the object measurement unit 12 and the size of the object estimated by the object estimation unit 23. The fourth evaluation value X4 is computed (step ST65). As shown in FIG. 11B, as the size of the measured object is closer to the estimated size estimated based on the moving speed, the fourth evaluation value X4 gives a measure of the correctness in identifying the object, and may range between 0 and 100.

The preceding vehicle determination unit 24 then computes an overall evaluation value X based on the first evaluation value X1 or the second evaluation value X2, the third evaluation value X3, and the fourth evaluation value X4 (step ST66). More specifically, the preceding vehicle determination unit 24 computes the overall evaluation value X according to the following formula (1).

$$X = (1-\alpha-\beta)(X1 \text{ or } X2) + \alpha X3 + \beta X4 \tag{1}$$

Here, $\alpha$ is a weighting coefficient that may range between 0 and 1, $\beta$ is a weighting coefficient that may also range between 0 and 1, and $\alpha+\beta$ is smaller than 1.

When computing the overall evaluation value X, these weighting coefficients may be suitably changed so that more correct judgment may be achieved by the preceding vehicle determination unit 24.

Referring back to FIG. 3, following the preceding vehicle determination process of step ST29, the preceding vehicle determination unit 24 determines if the overall evaluation value X has reached a prescribed threshold value Xth (step ST30). If the overall evaluation value X has reached the threshold value Xth (Yes in step ST30), the preceding vehicle determination unit 24 determines that the object associated with the selected ID is the correct vehicle to be followed (step ST31). If the overall evaluation value X has not reached the threshold value Xth (No in step ST30), the preceding vehicle determination unit 24 determines if the number recognition has been performed n times for the selected ID (step ST32). When the number recognition has not been performed n times (No in step ST32), the preceding vehicle determination unit 24 suspends the determination (step ST33). When the number recognition has been performed n times (Yes in step ST32), the preceding vehicle determination unit 24 determines that the object associated with the selected ID is not the vehicle to be followed (step ST34), and this determination result is stored in the storage unit 18 (step ST35).

If it is determined that the object associated with the selected ID is not the vehicle to be followed in step ST27 (No in step ST27), or if it is determined that the adaptive cruise control is canceled in step ST28 (Yes in step ST28), the process of step ST34 and step ST35 is performed. This concludes one operation cycle of the tracking vehicle setting process performed by the preceding vehicle identification unit 15.

The adaptive cruise control device 10 of the vehicle 1 configured as described above provides various advantages as summarized in the following. As shown in FIG. 1, the number recognition server 21 recognizes the characters (numbers) of the extracted license plate, and the number recognition client 22 compares the characters recognized from the captured image with the stored characters of the license plate of the vehicle to be followed. Therefore, the authentication accuracy (identification accuracy) of the vehicle to be followed by the preceding vehicle determination unit 24 is improved.

The number recognition server 21 estimates an area of each vehicle detected by the object measurement unit 12, and recognize the plate number from a highly localized area in the entire image of the detected vehicle. Thus, the combination of the object measurement by the object measurement unit 12 and the number authentication by the image capturing unit 11 ensures an accurate authentication with a minimum computation load.

When the preceding vehicle determination unit 24 determines that the object associated with the ID of the vehicle to be followed is not suitable as the vehicle to be followed in step ST34 of FIG. 3 and the object measurement unit 12 loses sight of the vehicle to be followed (No in step ST42 in FIG. 4), the number recognition client 22 assigns a ranking order for a preceding vehicle candidate to each object according to the position of the object (step ST51 and step ST52, and FIGS. 8 to 10), and designates the image recognition area A3 to recognize the plate number according to this order until the correct vehicle to be followed is determined.

At this time, since the number recognition client 22 sets the order for the candidates according to the proximity of each candidate from the previous position of the previously determined preceding vehicle, optionally taking into account the previous detected speed of the object designated as the candidate. Thereby, the correct preceding vehicle to be followed can be determined in a relatively short period of time.

If the object measurement unit 12 is unable to detect an object, and the number recognition client 22 is unable to specify the position of the object for which the suitability as the vehicle to be followed was determined immediately before (No in step ST50), the entire area of the image is searched by the number recognition client 22 (step ST53) so that the preceding vehicle may be determined from the image of the image capturing unit 11.

In the case where the object associated with the ID for the designated preceding vehicle is located within the measurement area A2 and outside the image capturing area A1, and the object measurement unit 12 has not lost sight of the determined preceding vehicle (No in step ST47), as is the case with the object with ID=7 in FIG. 7, the number recognition client 22 does not select the ID in step ST49 so that the image processing of the license plate is not performed to avoid the unnecessary processing load associated with the number recognition.

The preceding vehicle determination unit 24 computes a first evaluation value X1 according to the degree of coincidence of the characters matched by the number recognition client 22 (step ST62), and computes an overall evaluation value X based on the first evaluation value X1 (step ST66). When the overall evaluation value X is equal to or greater than the prescribed threshold value Xth (Yes in Step ST30), the object with the ID associated with the designated preceding vehicle is determined to be correct (Step ST31), the preceding vehicle can be accurately authenticated.

When the license plate is not properly extracted in the image capturing area A1 by the number recognition server 21 (No in step ST61), the preceding vehicle determination unit 24 compares the shape of the detected object with the shape of the object detected in the immediately preceding measurement, and computes a second evaluation value X2 based on the result of comparison (Step ST63). By evaluating the overall evaluation value X based on or taking into account the second evaluation value X2 (step ST66), the vehicle to be followed can be accurately authenticated.

The preceding vehicle determination unit 24 computes a third evaluation value X3 according to the difference between the position of the object measured by the object measurement unit 12 and the position of the object estimated by the object estimation unit 23 (step ST64). The overall evaluation value X may be computed based on or by taking into account the evaluation value X3 (step ST66) so that the vehicle to be followed can be accurately authenticated.

The preceding vehicle determination unit 24 may compute a fourth evaluation value X4 according to the difference between the size of the object measured by the object measurement unit 12 and the size of the object estimated by the object estimation unit 23 (step ST65). The overall evaluation value X may be computed based on or by taking into account the evaluation value X4 (step ST66) so that the vehicle to be followed can be accurately authenticated.

The preceding vehicle determination unit 24 may compute an overall evaluation value by taking a weighted average of the first evaluation value X1 or the second evaluation value X2, the third evaluation value X3, and the fourth evaluation value X4 using appropriate weighting coefficients $(1-\alpha-\beta, \alpha, \beta)$. Since X is computed (step ST66) and the weight can be changed according to the traveling state of the own vehicle, the preceding vehicle can be authenticated all the more accurately.

The present invention has been described in terms of a specific embodiment, but can be modified in various ways without departing from the spirit of the present invention. For example, the present invention may also be applied to vehicles of other forms such as aircraft, water craft and railway cars.

The invention claimed is:

1. An adaptive cruise control device, comprising:
an object measurement unit configured to detect objects located ahead of an own vehicle, assign an identification (ID) to each of the detected objects, and measure a direction and a distance to each of the detected objects;
a user interface configured to accept an input to designate a preceding vehicle to be followed from the objects detected by the object measurement unit;
an image capturing unit configured to capture an image of each of at least some of the objects detected by the object measurement unit:
a license plate recognition unit configured to extract a license plate area from each image captured by the image capturing unit, and recognize alphanumeric characters from each license plate area by using an image recognition technique;
a storage unit configured to store information on the designated preceding vehicle, the information including the ID and alphanumeric characters of a license plate of the designated preceding vehicle;
an alphanumeric character matching unit configured to compare the alphanumeric characters recognized from the image of the license plate area captured by the image capturing unit with the alphanumeric characters stored in the storage unit;
a preceding vehicle determination unit configured to determine the designated preceding vehicle from an output from the object measurement unit, and correct or authenticate the determined preceding vehicle according an output from the alphanumeric character matching unit; and
a drive control unit configured to control driving of the own vehicle so as to follow the determined preceding vehicle.

2. The adaptive cruise control device according to claim 1, wherein the user interface is configured to accept an input of the ID associated with the preceding vehicle to be followed.

3. The adaptive cruise control device according to claim 1, wherein the user interface is configured to accept an input of the alphanumeric characters on the license plate of the preceding vehicle to be followed, and forward the accepted alphanumeric characters to the storage unit.

4. The adaptive cruise control device according to claim 1, further comprising an object estimation unit configured to estimate a current position of each of the detected objects from a previous position of the detected object as measured by the object measurement unit in a previous operation cycle,
wherein upon failing to authenticate the determined preceding vehicle according to the output from the alphanumeric character matching unit, the preceding vehicle determination unit is configured to identify an object which is closest to the estimated current position of the determined preceding vehicle as the designated preceding vehicle.

5. The adaptive cruise control device according to claim 4, wherein the estimated current position of each of the detected objects is the previous position of the detected object.

6. The adaptive cruise control device according to claim 4, wherein the estimated current position of each of the detected objects is estimated from the previous position of the detected object by taking into account a previously detected speed of the detected object.

7. The adaptive cruise control device according to claim 4, wherein when the determined preceding vehicle is not authenticated by the preceding vehicle determination unit, the preceding vehicle determination unit is configured to select from the detected objects at least one candidate for the designated preceding vehicle which is located closest to the estimated current position of the determined preceding vehicle.

8. The adaptive cruise control device according to claim 1, wherein the object measurement unit covers a wider area than the image capturing unit.

9. The adaptive cruise control device according to claim 1, wherein the object measurement unit comprises a LIDAR device.

10. The adaptive cruise control device according to claim 1, wherein the preceding vehicle determination unit is configured to compute a first evaluation value according to a difference between the alphanumeric characters on the license plate of the determined preceding vehicle and the alphanumeric characters as stored in the storage unit, the first evaluation value being taken into account when the determined preceding vehicle is corrected or authenticated by the preceding vehicle determination unit.

11. The adaptive cruise control device according to claim 10, wherein when the license plate recognition unit has failed to recognize the alphanumeric characters on the license plate of the determined preceding vehicle, the preceding vehicle determination unit is configured to compute a second evaluation value according to a difference between a currently detected shape of the determined preceding vehicle and a previously detected shape of the determined preceding vehicle, the second evaluation value being taken into account when the determined preceding vehicle is corrected or authenticated by the preceding vehicle determination unit.

12. The adaptive cruise control device according to claim 11, wherein the preceding vehicle determination unit is configured to compute a third evaluation value according to a difference between a currently detected position of the determined preceding vehicle and a previously detected position of the determined preceding vehicle, the third evaluation value being taken into account when the determined preceding vehicle is corrected or authenticated by the preceding vehicle determination unit.

13. The adaptive cruise control device according to claim 12, wherein the preceding vehicle determination unit is configured to compute a fourth evaluation value according to a difference between a currently detected size of the determined preceding vehicle and a previously detected size of the determined preceding vehicle, the fourth evaluation value being taken into account when the determined preceding vehicle is corrected or authenticated by the preceding vehicle determination unit.

14. The adaptive cruise control device according to claim 13, wherein a weighted sum of the first or the second evaluation value, the third evaluation value and the fourth evaluation value is taken into account when the determined preceding vehicle is corrected or authenticated by the preceding vehicle determination unit.

\* \* \* \* \*